(12) United States Patent
Yoshida et al.

(10) Patent No.: US 8,550,427 B2
(45) Date of Patent: Oct. 8, 2013

(54) NORMALLY-OPEN SOLENOID VALVE INCLUDING PLUNGER FORMED WITH PRESSURE RECEIVING PORTION

(75) Inventors: Keigo Yoshida, Atsugi (JP); Norihiro Saita, Atsugi (JP); Satoshi Doi, Atsugi (JP); Tadaharu Yokota, Atsugi (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 387 days.

(21) Appl. No.: 12/879,265

(22) Filed: Sep. 10, 2010

(65) Prior Publication Data
US 2011/0062361 A1   Mar. 17, 2011

(30) Foreign Application Priority Data
Sep. 17, 2009 (JP) ................. 2009-215628

(51) Int. Cl.
*F16K 31/06* (2006.01)
(52) U.S. Cl.
USPC .................. 251/129.02; 303/119.2
(58) Field of Classification Search
USPC ......... 251/129.01, 129.02, 129.15; 303/119.2
See application file for complete search history.

(56) References Cited

U.S. PATENT DOCUMENTS

| | | | | |
|---|---|---|---|---|
| 4,690,373 A | * | 9/1987 | Linder et al. | 251/129.02 |
| 4,715,578 A | * | 12/1987 | Seltzer | 251/25 |
| 5,476,243 A | * | 12/1995 | Oehler et al. | 251/24 |
| 5,673,980 A | * | 10/1997 | Schwarz et al. | 303/119.2 |
| 6,453,930 B1 | * | 9/2002 | Linkner et al. | 137/15.18 |
| 6,644,621 B2 | * | 11/2003 | Ji et al. | 251/129.02 |
| 6,679,567 B1 | | 1/2004 | Tackett et al. | |
| 6,988,707 B2 | * | 1/2006 | Ahn | 251/129.15 |
| 7,165,754 B2 | * | 1/2007 | Trautmann et al. | 251/129.05 |
| 7,168,679 B2 | * | 1/2007 | Shirase et al. | 251/129.02 |
| 2007/0069172 A1 | * | 3/2007 | Brenner et al. | 251/129.15 |
| 2007/0176136 A1 | * | 8/2007 | Speer et al. | 251/321 |
| 2008/0185548 A1 | * | 8/2008 | Takahashi et al. | 251/129.15 |
| 2008/0203343 A1 | * | 8/2008 | Kratzer | 251/129.15 |

FOREIGN PATENT DOCUMENTS

| | | |
|---|---|---|
| JP | 11-500678 | 1/1999 |
| JP | 2000-517263 | 12/2000 |
| JP | 2004-255615 | 9/2004 |
| JP | 2008-121721 | 5/2008 |

OTHER PUBLICATIONS

JP Office Action for Japanese Application No. 2009-215628, issued on Sep. 26, 2012.

* cited by examiner

*Primary Examiner* — John Bastianelli
(74) *Attorney, Agent, or Firm* — Antonelli, Terry, Stout & Kraus, LLP.

(57) ABSTRACT

A solenoid valve includes a solenoid coil, a yoke of magnetic material, an armature of magnetic material to move in an axial direction of the solenoid coil when the solenoid coil is energized, a plunger to be moved with the armature, a valve seat member including a seat portion formed with a valve hole to be closed and opened by a forward end portion of the plunger, and a coil spring which is disposed between a spring receiving portion of the plunger and the valve seat member, around the plunger. The plunger includes a pressure receiving portion (such as a flat portion) which extends in a radial direction of the plunger at a position between the forward end portion and the spring receiving portion of the plunger, and which faces to the seat portion.

18 Claims, 6 Drawing Sheets

NORMALLY-OPEN SOLENOID VALVE INCLUDING PLUNGER FORMED WITH PRESSURE RECEIVING PORTION

BACKGROUND OF THE INVENTION

The present invention relates to normally-open type solenoid valve or electromagnetic valve.

A patent document JP2008-121721A shows a normally-open solenoid valve including a damper chamber behind a plunger, and an elastic member disposed between the damper chamber and a valve chamber receiving a valve element, and designed to define a throttle passage. The elastic member functions to increase the cross sectional size of the throttle passage by deformation just after opening of the valve, and thereby to facilitate the flow of an operating fluid toward the damper chamber, to suppress self excited vibrations.

SUMMARY OF THE INVENTION

In order to design a solenoid valve capable of treating a greater flow rate, it is generally desirable to increase a seat diameter and to decrease the diameter of a forward end of a plunger. However, the flow of the operating fluid between the valve seat and plunger becomes fast with increase of the flow rate, and tends to develop a negative pressure which acts to pull the plunger, and induce vibrations of the plunger. The addition of a damper chamber as in the above-mentioned patent document is disadvantageous in that the size of the valve is increased. Therefore, it is an object of the present invention to provide a solenoid valve for suppressing vibrations and preventing a size increase of the valve.

According to one aspect of the present invention, a solenoid valve includes a plunger formed with a pressure receiving portion spreading radially.

DETAILED DESCRIPTION OF THE INVENTION

First Embodiment

Figure 1:
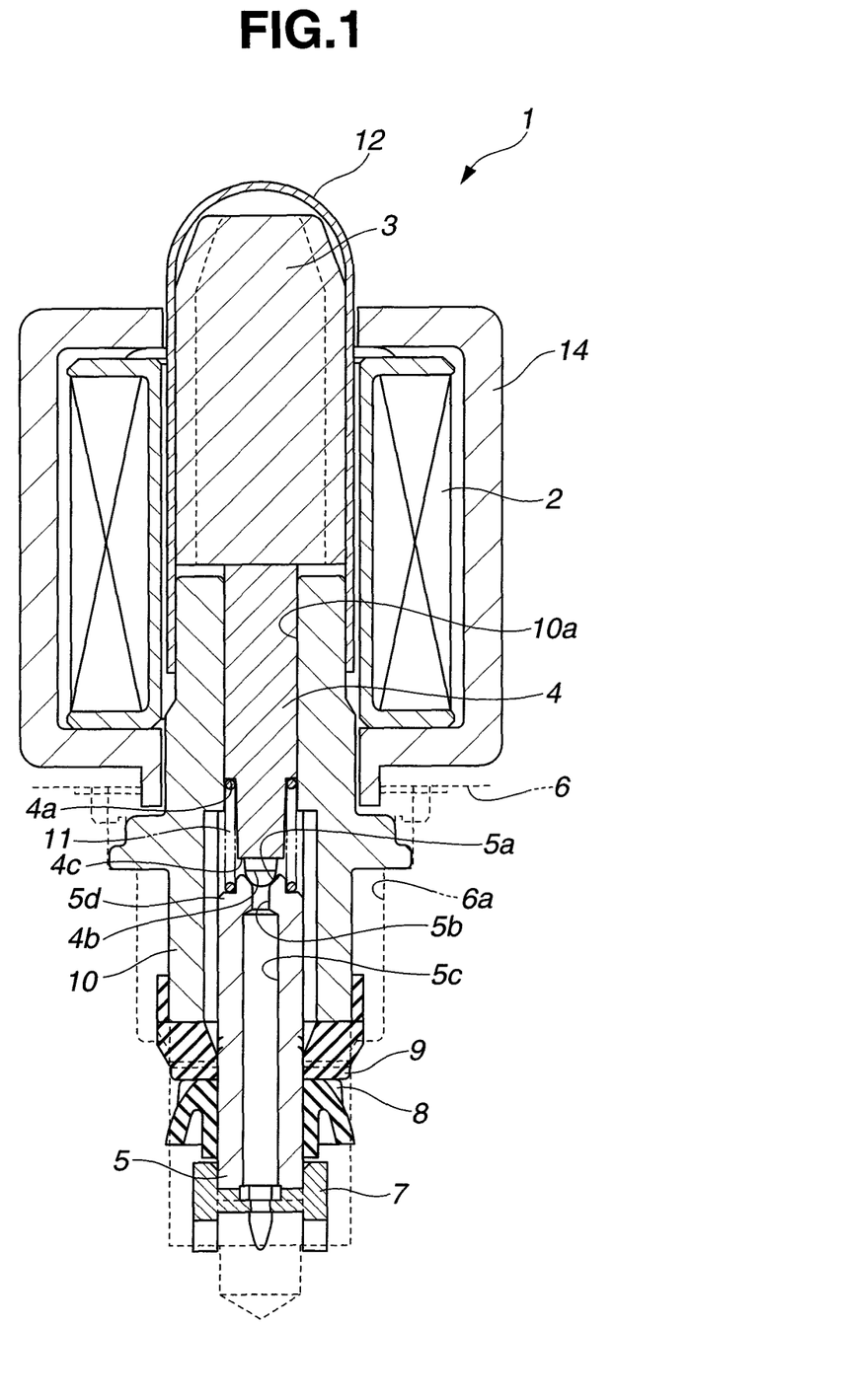
FIG. 1 is a sectional view showing a solenoid valve according to a first embodiment of the present invention.

[Structure of Solenoid valve] A solenoid valve or electromagnetic valve 1 according to a first embodiment of the present invention is a normally-open valve to be used in a brake system of a vehicle. FIG. 1 shows the solenoid valve 1 in section. Solenoid valve 1 includes a solenoid coil 2 to produce an electromagnetic force when energized, an armature 3 made of magnetic material and arranged to actuated by the electromagnetic force, a plunger 4 to move as a unit with armature 3, a valve seat 5 having an orifice hole 5b opened and closed by plunger 4, and a valve body 10 housing the plunger 4.

The valve seat 5 includes a seat portion 5a, a spring receiving (or retaining) portion 5d (serving as a base from which the seat portion 5a projects axially) and a fluid passage 5c. The seat portion 5a is formed at a first end of valve seat 5 extending axially or longitudinally from the first end to a second end. Seat portion 5a is a funnel-shaped portion having a recess tapering to the orifice hole 5b (or valve hole). The spring receiving portion 5d is formed around the seat portion 5a, and arranged to retain one end of a coil spring 11. The fluid passage 5c extends axially from the orifice hole 5b to the second end of valve seat 5.

The plunger 4 is a non-magnetic member made of a resin, extending from a first end connected with armature 3, to a second end or forward end 4b. Plunger 4 includes a spring receiving (or retaining) portion 4a which is formed between the first and second ends of plunger 4 and which is arranged to retain the other end of coil spring 11. Plunger 4 includes a base portion extending from the first end to the spring receiving portion 4a, and a shaft portion having an outside circumferential surface 4e and extending from the spring receiving portion 4a toward the second end 4b. The shaft portion is a tapering portion tapering from the spring receiving portion 4a toward the second end 4b. Plunger 4 further includes a forward end portion including the forward end or tip 4b, which is formed as a valve element 4b for abutting against the seat portion 5a. The valve element 4b is a hemispherical portion shaped like a half of a sphere. Plunger 4 further includes a pressure receiving portion 4c (which can correspond to a flat portion) formed between valve element 4b and spring receiving portion 4a, as explained below more in detail.

The valve body 10 is a tubular member having a bore 10a extending axially through. The plunger 4 and valve seat 5 are received in the bore 10a of valve body 10. The base portion of plunger 4 is slidable axially in bore 10a.

A housing 6 of the brake system includes a valve receiving hole 6a for receiving the solenoid valve 1. Into this valve receiving hole 6a of housing 6, a filter 7, the valve seat 5 equipped with a first seal 8, and the valve body 10 equipped with a second seal 9 are inserted one after another. Valve body 10 is fixed to housing 6, by stalking in this example. Plunger 4 is connected with armature 3 and inserted into the bore 10a of valve body 10. In this operation, the coil spring 11 is set around the shaft portion extending from the spring receiving portion 4a to the valve element 4b, and disposed between the spring receiving portion 4a of plunger 4 and the spring receiving portion 5d of valve seat 5 so that the coil spring 11 urges the plunger 4 toward armature. Thus, plunger 4 is urged by coil spring 11 in a direction away from the seat portion 5a of valve seat 5 (that is, the valve opening direction).

Armature 3 is received in a cylinder 12 having a rounded bottom shaped like a hemisphere. An open end portion of cylinder 12 is fixed to valve body 10 by welding in this example. Solenoid coil 2 is received in a yoke 14 which is made of a magnetic material and attached so that armature 3 is surrounded by yoke 14. In the open valve state, the operating fluid is supplied from a master cylinder to a wheel cylinder of the brake system of a vehicle, by the route of the filter 7, fluid passage 5c of valve seat 5, orifice hole 5b, the bore of valve body 10, a through hole which is formed through the side wall of valve body 10 to convey the fluid from the bore to the outer side of valve body, and a fluid passage formed in the housing 6.

Figure 2:
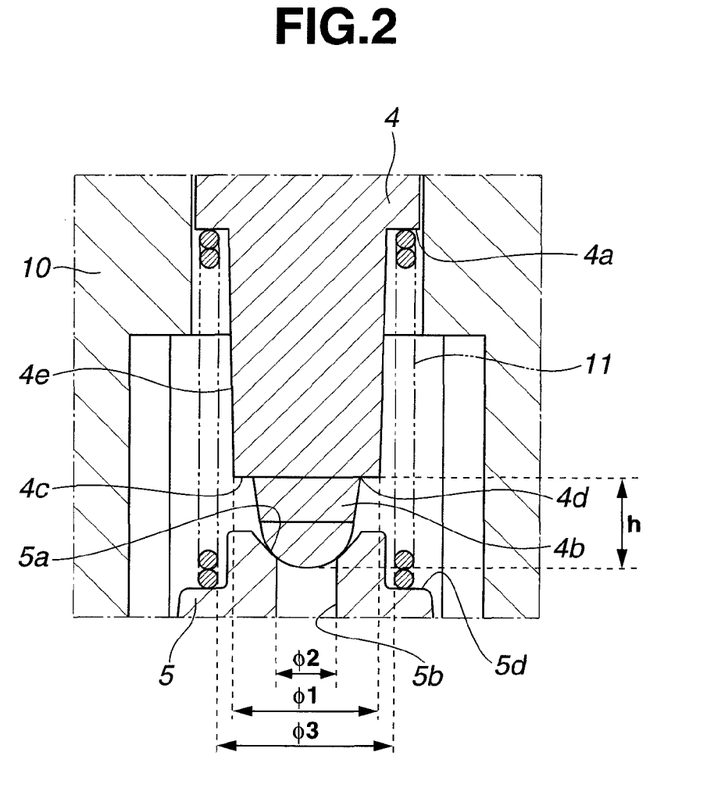
FIG. 2 is an enlarged sectional view showing a forward end of a plunger and a seat portion of the solenoid valve of FIG. 1.

[Structure of Plunger] FIG. 2 shows the valve element 4b of plunger 4 and the seat portion 5a of valve seat 5 in enlarged section. The pressure receiving portion 4c is a flat portion extending in a radial direction of plunger 4 at a intermediate position between valve element 4b and spring receiving portion 4a. Pressure receiving portion 4c is formed continuously between a large diameter portion 4d of valve element 4b and an outside circumferential surface 4e of the shaft portion. The outside diameter P1 of pressure receiving portion 4c is greater than a hole diameter (or seat diameter) ϕ2 of seat portion 5a. Furthermore, the outside diameter ϕ1 of pressure receiving portion 4c is smaller than the inside diameter ϕ3 of coil spring 11. The height h from the forward end of valve element 4b to the pressure receiving portion 4c is approximately equal to a quantity which is once and half times as long as the seat diameter ϕ2 of seat portion 5a.

Figure 3:
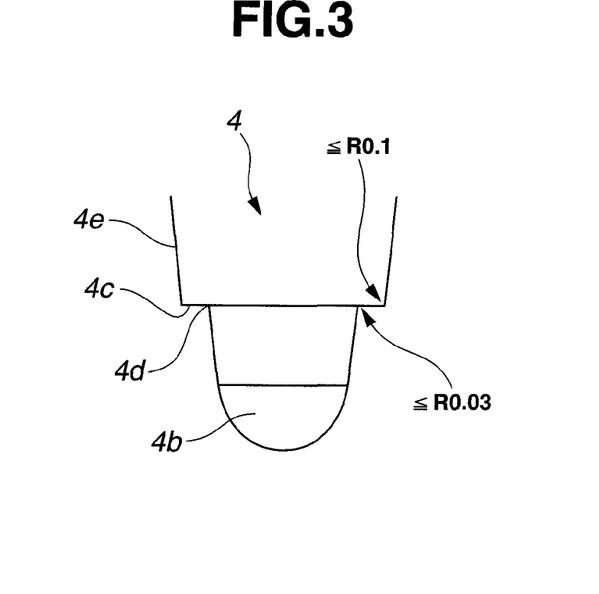
FIG. 3 is an enlarged view showing the forward end of the plunger shown in FIG. 2.
Figure 4:
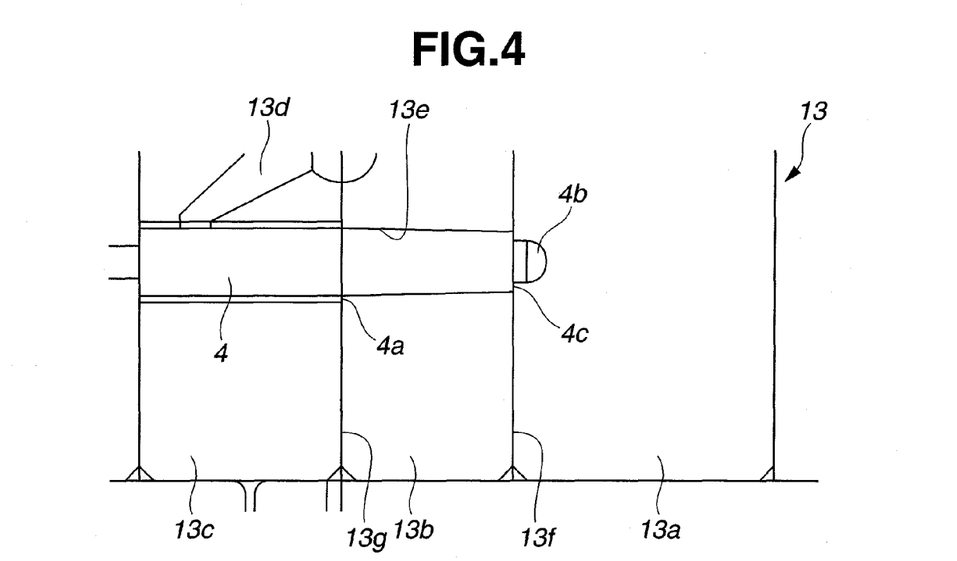
FIG. 4 is a view for illustrating a production method of the plunger according to the first embodiment.

FIG. 3 shows the forward end portion of plunger 4 in an enlarged scale, and FIG. 4 is a view for illustrating a process of forming the plunger 4. Plunger 4 is formed by injecting a resin into a mold or forming or molding die 13 including a cavity 13e in the form of plunger 4. The resin is injected through an injection hole formed in mold 13. The mold 13 is a mold which can be divided into a first mold 13a, a second mold 13b and a third mold 13c. Mold 13 has first and second parting lines 13f and 13g along which mold 13 is parted. First parting line 13f between first and second molds 13a and 13b is located at the position of pressure receiving portion 4c. Second parting line 13g between the second and third molds 13b and 13c is located at the position of spring receiving portion 4a.

[Operation] To increase the flow rate of the solenoid valve, it is desirable to increase the seat diameter and to reduce the diameter of the forward end of the plunger. However, the flow velocity of the operating fluid flowing between the seat and plunger becomes higher with increase of the flow rate. Therefore, the negative pressure increases in a direction to pulling in or sucking down the plunger, and increases the possibility of vibration of the plunger.

Figure 5:
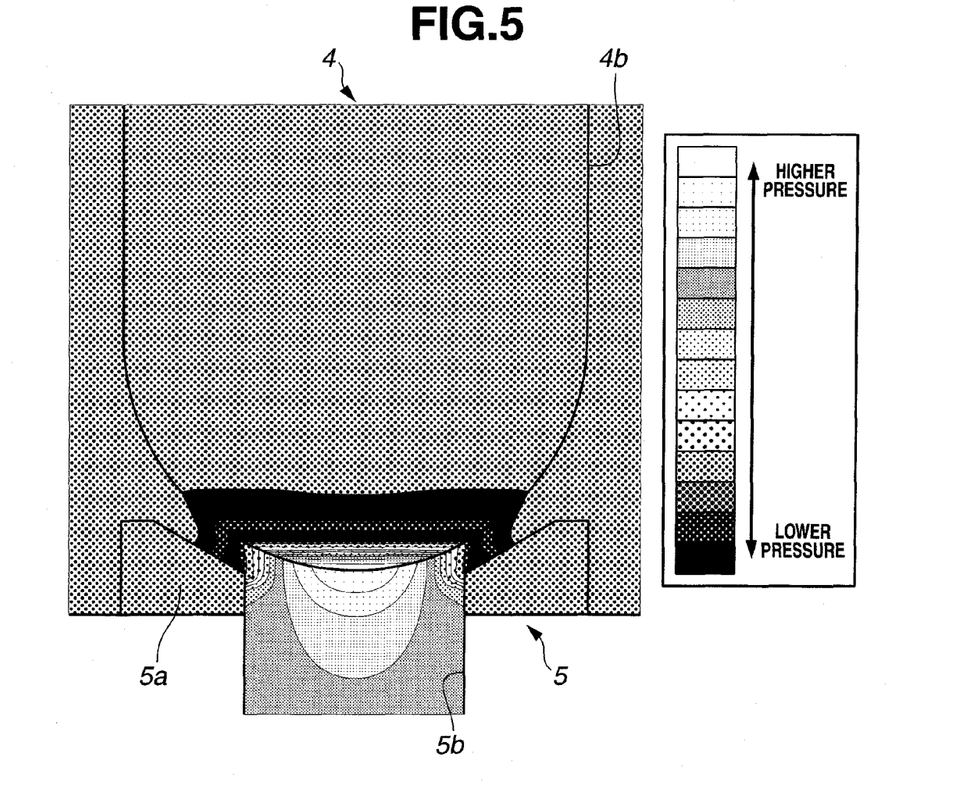
FIG. 5 is a view for illustrating a pressure distribution around the forward end of the plunger.

FIG. 5 is a view showing a pressure distribution appearing when the operating fluid flows through an interspace opened between the valve element 4b of plunger 4 and the seat portion 5a of valve seat 5. As shown in FIG. 5, a negative pressure or vacuum is produced between valve element 4b and seat portion 5a. By this negative pressure, the plunger 4 moves in the valve closing direction toward valve seat 5, and thereby decreases the flow quantity of the fluid flow through the interspace between valve element 4b and seat portion 5a. With the decrease of the flow quantity, the flow velocity decreases, and the negative pressure diminishes, so that the plunger 4 moves in the valve opening direction away from valve seat 5. By repeating this cycle, the plunger 4 tends to vibrate.

Figure 6:
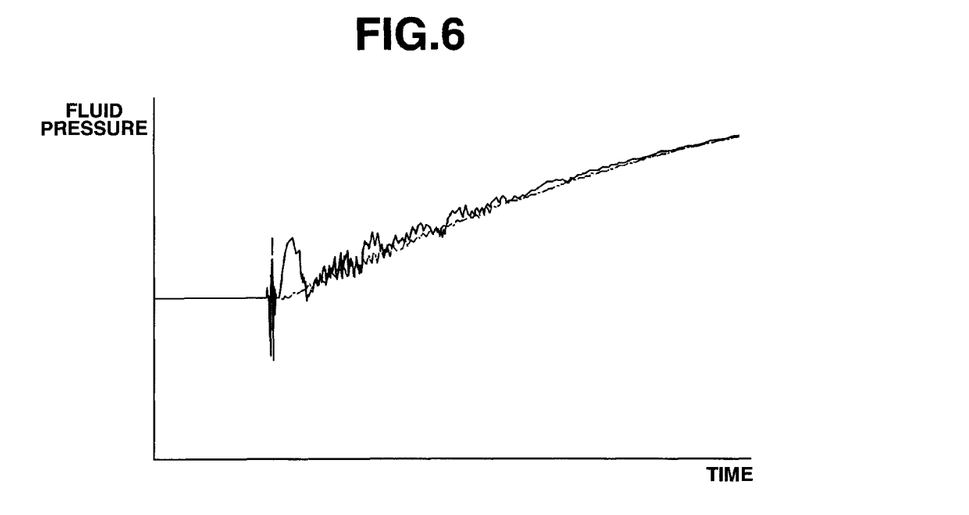
FIG. 6 is a time chart of a wheel cylinder pressure.

FIG. 6 is a time chart showing a fluid pressure of a wheel cylinder in the case of a plunger having no pressure receiving portion 4c. As shown in FIG. 6, the wheel cylinder pressure fluctuates because the supply quantity of the operating fluid is inconstant due to vibrations of plunger 4. A solenoid valve including a damper chamber formed behind the armature 3, and a fluid passage for supplying the operating fluid to the damper chamber may be effective for preventing vibrations of plunger 4. However, this solenoid valve increases the size of the valve and complicates the structure. Therefore, the plunger 4 according to the first embodiment is formed with the pressure receiving portion 4c designed to prevent vibrations. The pressure receiving portion 4c extends radially at the position between the valve element 4b and spring receiving portion 4a, and has the size (or the outside diameter) smaller than the inside diameter of coil spring 11.

Figure 7:
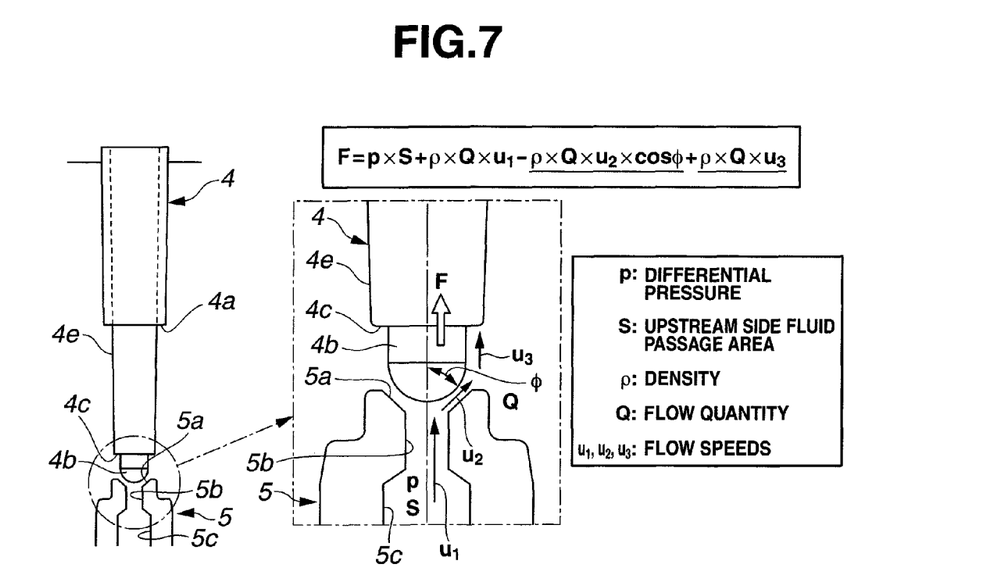
FIG. 7 is a schematic view for illustrating fluid dynamic forces acting on the plunger of the solenoid valve according to the first embodiment.

FIG. 7 is a view for illustrating hydrodynamic forces acting on plunger 4. In FIG. 7, hatching is omitted for simplification. A force F acting on plunger 4 in the valve opening direction due to the operating fluid is given by a following equation.

$$F = p \times S + \rho \times Q \times u1 - \rho \times Q \times u2 \times \cos\phi + \rho \times Q \times u3$$

In this mathematical expression: p is a differential pressure between the fluid pressure in fluid passage 5c of valve seat 5 and the fluid pressure in valve body 10; S is a fluid passage area of orifice hole 5b, ρ is the density of the operating fluid; Q is a flow quantity or flow rate of the operating fluid; u1 is a flow speed of the fluid flowing through orifice hole 5b; u2 is a flow speed of the fluid flowing through the interspace between seat portion 5a and valve element 4b; u3 is a flow speed of the fluid flowing toward the pressure receiving portion 4c; and ϕ is an angle between the direction of the force F and the direction of the fluid flowing through the interspace between seat portion 5a and valve element 4b. The term ρ×Q×u2×cos ϕ represents a negative pressure force acting in the valve closing direction. The term ρ×Q×u3 represents a force acting on the pressure receiving portion 4c in the valve opening direction.

Figure 8:
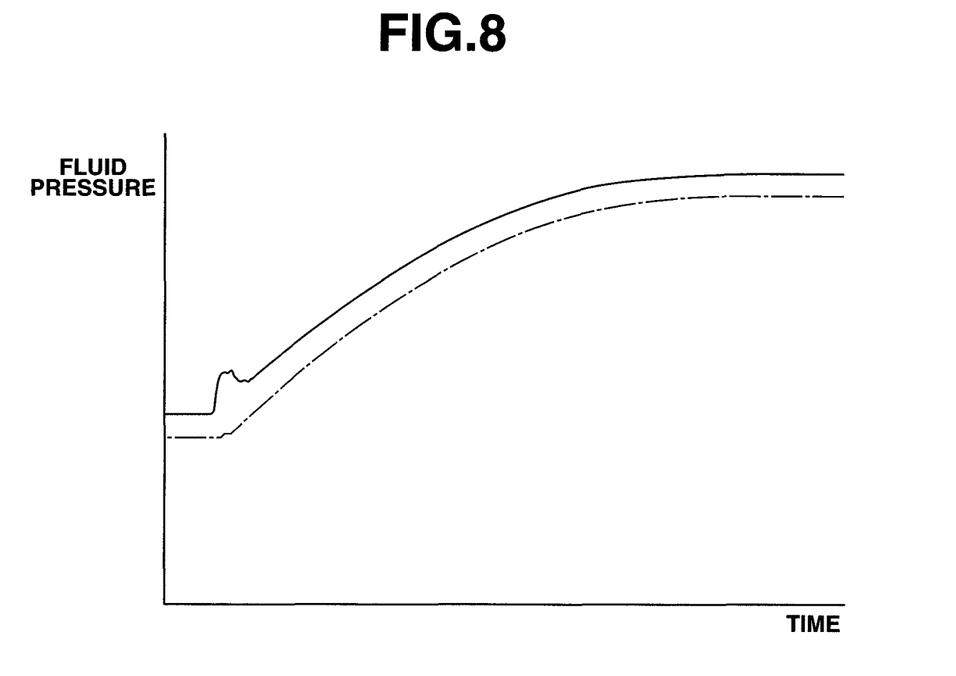
FIG. 8 is a time chart of a wheel cylinder pressure obtained by the solenoid valve according to the first embodiment.

As shown by the above-mentioned equation, in opposition to the negative pressure force drawing in the plunger 4, the fluid flowing out of the orifice hole 5b of valve seat 5 and bumping against the pressure receiving portion 4c of plunger 4 applies the pressure on the plunger 4 in the valve opening direction away from valve seat 5a. FIG. 8 is a time chart of the wheel cylinder fluid pressure supplied through the solenoid valve including the plunger 4 formed with pressure receiving portion 4c. As shown in FIG. 8, fluctuation of the fluid pressure is prevented. This is because vibrations of the plunger 4 is prevented, and the supply of the operating fluid is held constant. The pressure receiving portion 4c receives the pressure in the valve opening direction of moving plunger 4 away from seat portion 5a, and hence the plunger 4 receives the force opposing the negative pressure. Therefore, this solenoid valve can prevent vibrations of plunger 4. Pressure receiving portion 4c is in the form of a flat portion formed between valve element 4b and spring receiving portion 4a. Therefore, pressure receiving portion 4c can be formed without increasing the axial length of plunger 4 and without increasing the size of solenoid valve 1. Moreover, the outside diameter of pressure receiving portion 4c is smaller than the inside diameter of coil spring 11. Therefore, it is possible to prevent interference of plunger 4 with coil spring 11 and to prevent plunger 4 from being caught by coil spring 11.

In the illustrated example, the valve element 4b is hemispherical, and the pressure receiving portion 4c is formed continuously between the large diameter portion 4d of valve element 4b and the outside circumferential surface 4e. Moreover, the recessed corner formed between pressure receiving portion 4c and large diameter portion 4d is curved or rounded to have a radius of curvature equal to R0.03, and the projected corner between pressure receiving portion 4c and outside circumferential surface 4e is curved or rounded to have a radius of curvature equal to or smaller than R0.1. Therefore, the receiving portion 4c can have a sufficient area for preventing vibrations effectively.

Furthermore, in the illustrated example of the first embodiment, the plunger 4 is formed by injection molding of a resin using the mold 13 having the parting line 13f at the position of pressure receiving portion 4c. This arrangement makes it possible to reduce the radius of curvature at the corner between pressure receiving portion 4c and large diameter portion 4d, and the radius of curvature at the corner between pressure receiving portion 4c and outside circumferential surface 4e, and to facilitate the formation of pressure receiving portion 4c having a wider area.

Figure 9:
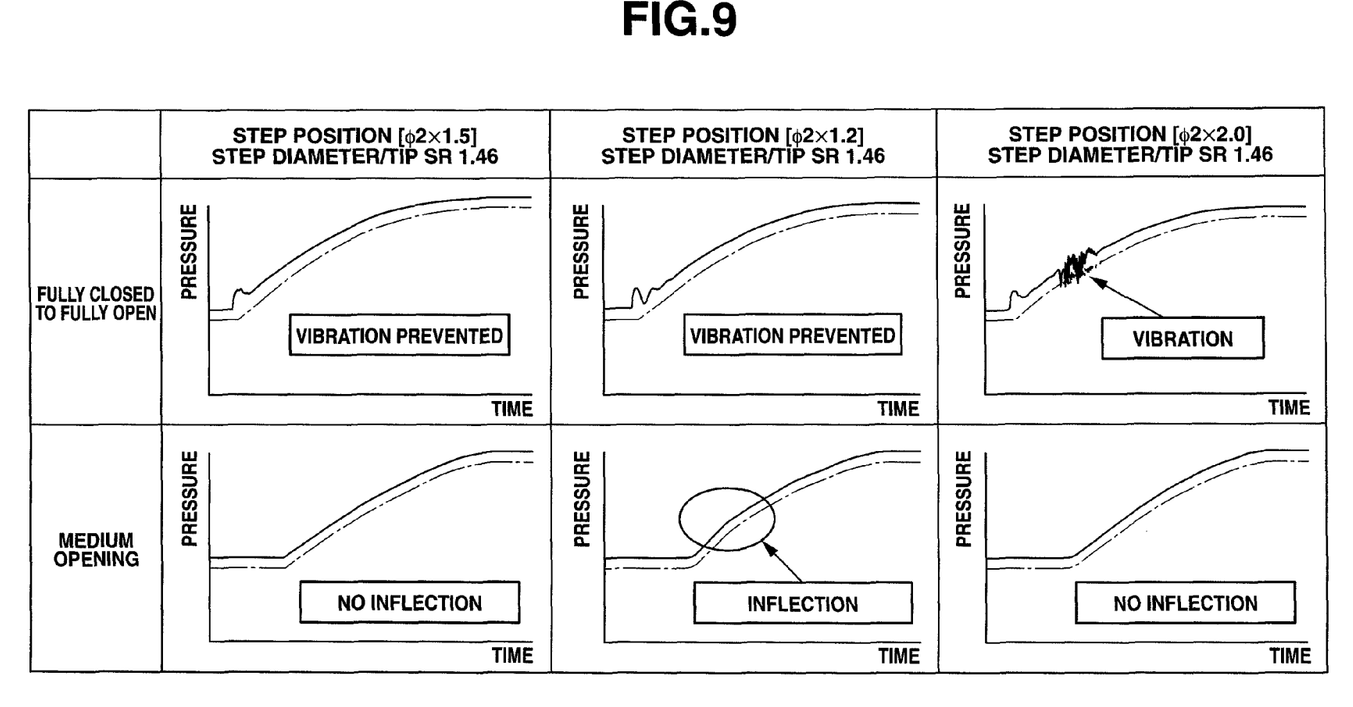
FIG. 9 is a view showing influences of the position (height) of a pressure receiving portion of the plunger according to the first embodiment.

Moreover, in the illustrated example, the height h measured from the forward end of valve element 4b to the so pressure receiving portion 4c is approximately one and half times as long as the seat diameter φ2 of seat portion 5a. FIG. 9 shows various fluid pressure waveforms of the wheel cylinder fluid pressure in the form of time chart, obtained when the height h from the forward end of valve is element 4b to the pressure receiving portion 4c is changed. The upper row of FIG. 9 shows three waveforms of the wheel cylinder fluid pressure when the solenoid valve 1 is opened from the fully-closed state to the fully-open state. The lower row of FIG. 9 shows three waveforms of the wheel cylinder fluid pressure when the solenoid valve 1 is opened at an intermediate opening degree. In the case of the solenoid valve 1 opened from the fully-closed state to the fully-open state, the plunger 4 is liable to vibrate since the flow speed is higher. In the case of the intermediate opening degree, the plunger 4 is less likely to vibrate since the flow speed is relatively low. However, in the case of the intermediate opening degree, it is desirable to avoid the generation of an inflection point in the wheel cylinder fluid pressure in order to hold the flow rate constant.

FIG. 9 shows a first example in which the step position (h) is approximately one and a half times as long as the seat diameter φ2 in a left side column of FIG. 9, a second example in which the step position (h) is approximately 1.2 times as long as the seat diameter φ2 in a center column, and a third example in which the step position (h) is approximately 2.0 times as long as the seat diameter φ2 in a right side column. In the second example (in which the height h is approximately equal to φ2×1.2), the solenoid valve can prevent vibrations of plunger 4. However, a point of inflection is produced in the fluid pressure when the opening degree of the solenoid valve is intermediate between the minimum setting (fully-closed) and the maximum setting (fully-open). In the third example (in which the height h is approximately equal to φ2×2.0), there is produced no inflection in the intermediate opening state. However, plunger 4 vibrates when the solenoid valve is opened from the fully-closed state to the fully-open state. In the first example (in which the height h is approximately equal to φ2×1.5) which is a practical example according to the first embodiment, the solenoid valve can prevent vibrations of plunger 4, and prevent the formation of inflection at the intermediate opening state.

Moreover, in this practical example according to the first embodiment, the outside diameter φ1 of pressure receiving portion 4c is set greater than the seat diameter φ2 of seat portion 5a. Therefore, the fluid discharged from seat portion 5a can impinge on the pressure receiving portion 4c efficiently, and thereby restrains vibrations efficiently.

[Effects] The first embodiment can provide following effects.

(I) A solenoid valve comprises: a solenoid coil (2) to produce a magnetic field when electric current is supplied; a yoke (14) of magnetic material receiving the solenoid coil; an armature (3) of magnetic material disposed on an inner peripheral side of the yoke, and arranged to move in an axial direction of the solenoid coil when the solenoid coil is energized; a plunger (4) of nonmagnetic material arranged to move with movement of the armature; a valve seat (5) including a seat portion (5a) formed with an orifice hole (or valve hole) 5b to be closed and opened by a forward end portion or a valve element (4b) of the plunger; and an coil spring (11) disposed between a spring receiving portion (4a) formed in the plunger and the valve seat or the valve seat member, around the plunger, and arranged to urge the plunger in a (valve opening) direction toward the armature (away from the seat portion). The plunger includes a pressure receiving portion (4c) which extends in a radial direction of the plunger at a position between the valve element (4b) of the plunger and the spring receiving portion (4a), and which has an outer circumference smaller than an inside diameter of the coil spring.

The operating fluid flows out of orifice hole (5b) of valve seat (5) and then impinges on the pressure receiving portion (4c) of plunger (4). Therefore, the plunger (4) receives pressure in the valve opening direction, and the force due to the pressure acts against the negative pressure and thereby prevents vibrations of plunger (4). The pressure receiving portion (4c) is the flat portion (4c) formed between the valve element (4b) and the spring receiving portion (4a). This arrangement makes it possible to form the pressure receiving portion without increasing the axial length of the plunger (4) and to prevent a size increase of the solenoid valve (1). Moreover, the size (or outside diameter) of the pressure receiving portion (4c) is smaller than the inside diameter of the coil spring (11). Therefore, it is possible to prevent the plunger (4) from being caught by, or interfering with, the coil spring (11).

(II) The valve element (4b) is shaped like a hemisphere, and the pressure receiving portion (4c) of the plunger (4) is formed continuously between a larger diameter portion (4d) of the hemispherical portion and an outside circumferential surface (4e) of the plunger. A first corner is formed between the pressure receiving portion (4c) and the larger diameter portion (4d), and a second corner is formed between the pressure receiving portion (4c) and the outside circumferential surface (4e) so that a radius of curvature of the first corner is smaller than or equal to R0.03 and/or a radius of curvature of the second corner is smaller than or equal to R0.1.

Therefore, the pressure receiving portion (4c) can be formed to have a sufficient area to prevent vibrations effectively.

(III) The plunger (4) is formed by plastic injection molding with a mold (13) having a parting line (13f) at which the position of the pressure receiving portion (4c) is located. Therefore, it is possible to form a sharper corner having a smaller radius of curvature at the corner between the pressure receiving portion (4c) and the larger diameter portion (4d) and the corner between the pressure receiving portion (4c) and the outside circumferential surface (4e), and thereby to increase the pressure receiving area of the pressure receiving portion (4c).

[Other Embodiments] Although the invention has been described above with reference to the first embodiment of the invention, the invention is not limited to the embodiment described above. Various modifications, variations and design changes are within the purview of the invention. For example, although, in the illustrated example of the first embodiment, the corner between pressure receiving portion 4c of plunger 4 and large diameter portion 4d is curved to have a radius of curvature smaller than or equal to R0.03 and the corner between pressure receiving portion 4c and outside circumferential surface 4e is curved to have a radius of curvature smaller than or equal to R0.1, it is optional to employ the arrangement in which the corner between pressure receiving portion 4c of plunger 4 and large diameter portion 4d is curved to have a radius of curvature greater than R0.03 and/or the corner between pressure receiving portion 4c and outside circumferential surface 4e is curved to have a radius of curvature greater than R0.1.

Furthermore, although in the illustrated example of the first embodiment, the height h from the forward end of the valve element 4b of plunger 4 to the pressure receiving portion 4c is approximately equal to a product obtained by multiplying the seat diameter φ2 by 1.5 to obtain stable controllability and vibration preventing characteristic, it is not always necessary to set the ratio (h/φ2) of the height h to the seat diameter φ2, equal to 1.5. It is optional to set the ratio (h/φ2) of the height h to the seat diameter φ2 properly in consideration of the distance of the pressure receiving portion 4c from the seat portion 5a which tends to cause inflection in the fluid pressure at an intermediate opening degree if the pressure receiving portion 4c is too close to seat portion 5a, and which tends to cause vibrations of the plunger in the operation of opening the solenoid valve 1 from the fully closed position to the fully open position if the pressure receiving portion 4c is too far from the set portion 5a.

In the illustrated example of the first embodiment, the coil spring 11 is disposed between the spring receiving portion 4a of plunger 4 and the spring receiving portion 5d of valve seat 5. However, it is optional to employ the arrangement in which the coil spring 11 is disposed between the spring receiving portion 4a of plunger 4 and a spring receiving portion formed in valve body 10, and arranged to urge the plunger 4 in the valve opening direction.

According to the first embodiment, a solenoid valve comprises: a valve seat member formed with a hole (or valve hole or orifice hole), and a plunger arranged to close the hole of the valve seat member (in a valve closing position, and to open the hole to open the valve). The plunger includes a pressure receiving portion facing to the valve seat member. The solenoid valve may further comprise any one or more of following features (F1)~(F27). (F1) The pressure receiving portion of the plunger is an annular step portion including an annular shoulder surface facing toward the valve seat member in an axial or longitudinal direction of the plunger (that is the direction in which the plunger moves toward and away from the valve seat). (F2) The pressure receiving portion of the plunger includes a flat shoulder surface (such as an annular flat shoulder surface) extends radially from an inner circumference to an outer circumference. (F3) The plunger includes a shaft portion, and a forward end portion. The pressure receiving portion is formed between the shaft portion and the forward end portion. (F4) The shaft portion of the plunger includes an outside circumferential surface (4e), the forward end portion (4b, 4d) includes an outside circumferential surface, and the pressure receiving portion (4c) includes a shoulder surface extending radially outwards from an inner circumference forming an inner (recessed or reentrant) corner with the outside circumferential surface of the forward end portion, to an outer circumference forming an outer (projected or salient) corner with the outside circumferential surface of the shaft section. (F5) The inner corner is rounded to have a first radius of curvature and the outer corner is rounded to have a second radius of curvature which is greater than the first radius of curvature. (F6) The outside circumferential surface of the shaft portion and the outside circumferential surface of the forward end section are in the form of surface of revolution (such as conical surface, cylindrical surface, or spherical surface), formed coaxially around a center axis of the plunger. (F7) The inner (recessed) corner and the outer (projected) corner extend circumferentially around the center axis of the plunger.

(F8) The forward end portion of the plunger includes a hemispherical tip end or tip. (F9) The valve seat member includes a seat portion (5a) which is a bowl-shaped or funnel-shaped portion including a recess recessed to a bottom in which the hole (5b) is open (like a funnel), and including a concave surface (such as a conical surface) spreading radially from the hole. (F10) The seat portion (5a) projects axially toward the plunger, from a base to a top end which is in the form of a rim or annular ridge confronting the pressure receiving portion (4c) of the plunger, and encircling the concave surface and the hole of the seat portion. (F11) The seat portion includes the concave surface (such as a conical surface) which extends from the bottom at which the hole is open, to an inner circumference of the rim encircling the concave surface, and the inside diameter of the inner circumference of the rim is smaller than the diameter of an outer circumference of the pressure receiving portion (which extends radially outwards from an inner circumference to the outer circumference).

(F12) The forward end portion of the plunger includes a frustum portion including an outside conical surface (4e), and a hemispherical tip end (4b) including a hemispherical surface formed continuously with the conical surface (so as to form a continuous surface of revolution). (F13) The conical surface of the frustum portion of the forward end portion of the plunger tapers from a larger base end (4d) surrounded contiguously by the pressure receiving portion, to a smaller top end from which the hemispherical tip end projects continuously toward the hole of the seat portion.

(F14) The solenoid valve further comprises a coil spring (11) arranged to urge the plunger (4) in a valve opening direction away from the hole (5b) of the seat portion (5a). (F15) The shaft portion and the forward end portion (4b, 4d) of the plunger, and the seat portion (5a) of the valve seat member are disposed in, and surrounded by the coil spring (11). (F16) The plunger (4) includes a base portion extending axially from a first end (which may be connected or fixed with an armature (3)) to a second end from which the shaft portion projects in an axial direction away from the first end. (F17) The plunger includes a spring receiving annular shoulder surface (4a) for retaining a first end of the coil spring (11), and the spring receiving annular shoulder surface (4a) is formed between the base portion and the shaft portion of the plunger in the form of a step. (F18) The base portion of the plunger is a cylindrical portion slidably fit in an axial bore (10a) of a valve body (10), and the shaft portion is coaxial with the base portion and smaller in cross sectional size than the base portion. (F19) The shaft portion tapers and becomes gradually smaller in cross sectional size from a first end connected with the base portion to a second end connected with the forward end portion. (F20) The shaft portion includes a conical outside circumferential surface (4e). (F21) The valve seat member includes a spring receiving portion (5d) for retaining a second end of the coil spring (11). (F22) The seat portion (5a) is surrounded by the spring receiving portion (5d) of the valve seat member, and the seat portion (5a) projects axially from the spring receiving portion (5d) of the valve seat member, toward the plunger.

(F23) The plunger (4) is made of nonmagnetic material. (F24) The plunger is a resin molding. (F25) The plunger is a resin molding formed by using a mold having a parting line surface (13f) in which the pressure receiving portion (4c) is located or exposed. (F26) The valve seat member may comprise a valve seat (5) or may comprise a valve seat (5) and a valve body (10). (F27) The pressure receiving portion (4c) of the plunger includes a shoulder surface facing axially toward the seat portion and extending radially outwards from an imaginary inner cylindrical surface defining an inner circumference of the shoulder surface, to an imaginary outer cylindrical surface surrounding the inner cylindrical surface coaxially and defining an outer circumference of the shoulder surface, the forward end portion projects axially from the inner circumference of the shoulder surface to a tip end (4b) within the imaginary inner cylindrical surface, and the forward end portion of the plunger has a height (h) which is measured from the shoulder surface (4c) to the tip end (4b). (F28) The height (h) of the forward end portion measured from the shoulder surface (4c) to the tip end (4b) is smaller than the diameter of the imaginary outer cylindrical surface.

This application is based on a prior Japanese Patent Application No. 2009-215628 filed on Sep. 17, 2009. The entire contents of this Japanese Patent Application are hereby incorporated by reference.

What is claimed is:

1. A normally-open solenoid valve comprising:
a solenoid coil to produce a magnetic field when energized;
a yoke of magnetic material encasing the solenoid coil;
an armature of magnetic material surrounded by the yoke, and arranged to move in an axial direction of the solenoid coil when the solenoid coil is energized;
a plunger of nonmagnetic nonmagnetic material arranged to move with movement of the armature;
a valve seat member including a seat portion formed with a fluid passage to be closed and opened by a forward end portion of the plunger moving toward and away from the seat portion; and
a coil spring disposed between a spring receiving portion of the plunger and the valve seat member, around the plunger, and arranged to urge the plunger in a direction toward the armature;
the plunger including a flat portion which extends in a radial direction of the plunger at a position between the forward end portion of the plunger and the spring receiving portion, which faces to the seat portion, and which has an outer circumference so sized that an outside diameter of the flat portion is smaller than an inside diameter of the coil spring;
wherein the forward end portion of the plunger includes a hemispherical end, the flat portion of the plunger is formed continuously between a larger diameter portion of the forward end portion and an outside circumferential surface of the plunger, the flat portion extends from an inner corner which is formed between the flat portion and the larger diameter portion, to an outer corner which is formed between the flat portion and the outside circumferential surface, and the inner and outer corners are formed so that a radius of curvature of the inner corner is smaller than or equal to R0.03 or a radius of curvature of the outer corner is smaller than or equal to R0.1.

2. The normally-open solenoid valve as recited in claim 1, wherein the forward end portion of the plunger is hemispherical, and the inner and outer corners are formed so that the radius of curvature of the inner corner is smaller than or equal to R0.03 and the radius of curvature of the outer corner is smaller than or equal to R0.1.

3. The normally-open solenoid valve as recited in claim 2, wherein the outside diameter of the flat portion is greater than a hole diameter of a hole of the seat portion against which the forward end portion of the plunger abuts.

4. The normally-open solenoid valve as recited in claim 3, wherein the length from the forward end portion to the flat portion of the plunger is equal to the hole diameter of the seat portion multiplied by 1.5.

5. The normally-open solenoid valve as recited in claim 3, wherein the length from the forward end portion to the flat portion of the plunger is equal to the hole diameter of the seat portion multiplied by 1.2.

6. The normally-open solenoid valve as recited in claim 1, wherein the plunger is a resin molding.

7. The normally-open solenoid valve as recited in claim 6, wherein the plunger is the resin molding formed by injection molding of a resin with a mold having a parting line at the position of the flat portion.

8. A normally-open solenoid valve comprising:
a resin molded plunger urged by a coil spring in a valve opening direction;
a drive section to actuate the plunger electromagnetically; and
a valve seat member including a fluid passage to be closed and opened by a forward end portion of the plunger and a seat portion arranged, so that the forward end portion of the plunger abuts against the seat portion and thereby closes the fluid passage;
the plunger including a fluid pressure receiving portion extending in a radial direction of the plunger at a position between the forward end portion of the plunger and a spring receiving portion of the plunger, facing to the sea portion, and having an outside diameter smaller than an inside diameter of the coil spring;
wherein the forward end portion of the plunger is hemispherical, the pressure receiving portion of the plunger is formed continuously between a larger diameter portion of the hemispherical forward end portion and an outside circumferential surface of the plunger, and a radius of curvature of a corner which is formed between the pressure receiving portion and the larger diameter portion is smaller than or equal to R0.03.

9. The normally-open solenoid valve as recited in claim 8, wherein a radius of curvature of a corner which is formed between the flat portion and the outside circumferential surface is smaller than or equal to R0.1.

10. The normally-open solenoid valve as recited in claim 9, wherein an outside diameter of the pressure receiving portion is greater than an inside diameter of a hole of the seat portion against which the forward end portion of the plunger abuts.

11. The normally-open solenoid valve as recited in claim 10, wherein the length from the forward end portion to the pressure receiving portion of the plunger is equal to the inside diameter of the hole of the seat portion multiplied by 1.5.

12. The normally-open solenoid valve as recited in claim 10, wherein the length from the forward end portion to the pressure receiving portion of the plunger is equal to the inside diameter of the hole of the seat portion multiplied by 1.2.

13. The normally-open solenoid valve as recited in claim 8, wherein the plunger is a resin molding formed by injection molding of a resin, with a mold having a parting line at the position of the pressure receiving portion.

14. A normally-open solenoid valve comprising:
a solenoid coil to produce a magnetic field when energized;
a yoke of magnetic material encasing the solenoid coil;
an armature of magnetic material surrounded by the yoke, and arranged to move in an axial direction of the solenoid coil when the solenoid coil is energized;
a plunger of nonmagnetic material arranged to move with movement of the armature;
a valve seat member including a seat portion formed with a hole to be closed and opened by a forward end portion of the plunger moving toward and away from the seat portion; and a coil spring disposed between a spring receiving portion of the plunger and the valve seat member, around the plunger, and arranged to urge the plunger in a valve opening direction away from the seat portion;

the plunger including a pressure receiving portion which extends in a radial direction of the plunger at a position between the forward end portion of the plunger and the spring receiving portion, and which faces to the seat portion;

wherein the forward end portion of the plunger includes a hemispherical end, the pressure receiving portion of the plunger is formed continuously between a lager diameter portion of the forward end portion and an outside circumferential surface of the plunger, the pressure receiving portion extends from an inner corner which is formed between the pressure receiving portion and the larger diameter portion, to an outer corner which is formed between the pressure receiving portion and the outside circumferential surface, and the inner and outer corners are formed so that a radius of curvature of the inner corner is smaller than or equal to R0.03 or a radius of curvature of the outer corner is smaller than or equal to R0.1.

15. The normally-open solenoid valve as recited in claim 14, wherein the plunger includes a shaft portion extending from the spring receiving portion to the forward end portion, and the shaft portion and the forward end portion of the plunger and the seat portion of the valve seat member are disposed in the coil spring.

16. The normally-open solenoid valve as recited in claim 15, wherein the pressure receiving portion includes an annular shoulder surface facing axially toward the seat portion and extending radially outwards from an inner circumference forming an inner recessed corner with an outside circumferential surface of the forward end portion, to an outer circumference forming an outer projected corner with an outside circumferential surface of the shaft portion.

17. The normally-open solenoid valve as recited in claim 14, wherein the pressure receiving portion includes a shoulder surface facing axially toward the seat portion and extending radially outwards from an imaginary inner cylindrical surface defining an inner circumference of the shoulder surface, to an imaginary outer cylindrical surface surrounding the inner cylindrical surface coaxially and defining an outer circumference of the shoulder surface, and the forward end portion projects axially from the inner circumference of the shoulder surface to a tip end within the imaginary inner cylindrical surface.

18. The normally-open solenoid valve as recited in claim 14, wherein the seat portion of the valve seat member projects to an annular top end confronting the pressure receiving portion of the plunger, and includes a concave conical surface which is formed around the hole and surrounded by the annular top end and which extends radially outwards from a circular inner circumference and terminates at a circular outer circumference, and the plunger includes the forward end portion including a hemispherical convex tip end abutting on the concave conical surface of the seat portion to close the hole in a valve closing position, and the pressure receiving portion including an annular shoulder surface extending radially outwards from a circular inner circumference having a diameter greater than a diameter of the circular inner circumference of the concave conical surface, to a circular outer circumference having a diameter which is greater than a diameter of the circular outer circumference of the conical surface.

* * * * *